United States Patent [19]
Holden

[11] 3,973,210
[45] Aug. 3, 1976

[54] ELECTRICAL WAVE FILTER

[76] Inventor: Thomas W. Holden, 301 W. 16 Pl., Chicago Heights, Ill. 60411

[22] Filed: Jan. 14, 1975

[21] Appl. No.: 540,858

[52] U.S. Cl................................ 328/167; 333/20; 333/70 R
[51] Int. Cl.²..................... H04B 15/00; H03K 5/04; H03H 7/02
[58] Field of Search............... 333/70 R, 14, 20; 328/91, 102, 167, 171, 102; 325/322–324; 330/129–132, 135–136, 139–141; 329/104–109; 178/88

[56] References Cited
UNITED STATES PATENTS

| | | | |
|---|---|---|---|
| 2,220,260 | 11/1940 | Meier | 328/171 X |
| 2,532,450 | 12/1950 | Hings | 329/105 X |
| 2,606,972 | 8/1952 | Scott | 333/70 R X |
| 2,937,273 | 5/1960 | Franco | 329/105 X |
| 3,846,719 | 11/1974 | Dolby | 333/14 |

Primary Examiner—Alfred E. Smith
Assistant Examiner—Marvin Nussbaum

[57] ABSTRACT

A selective wave filter that employs a frequency selective circuit that provides a waveform that represents the envelope of an input tone burst, such as a dot or dash used in radio telegraphy. The output of the frequency selective circuit is connected to a rectifier and the output of the rectifier is connected to a filter that removes most of the audio components and allows the resultant pulse to pass to an output circuit. The output circuit employs apparatus in the form of a balanced modulator, voltage controlled amplifier or the like.

3 Claims, 1 Drawing Figure

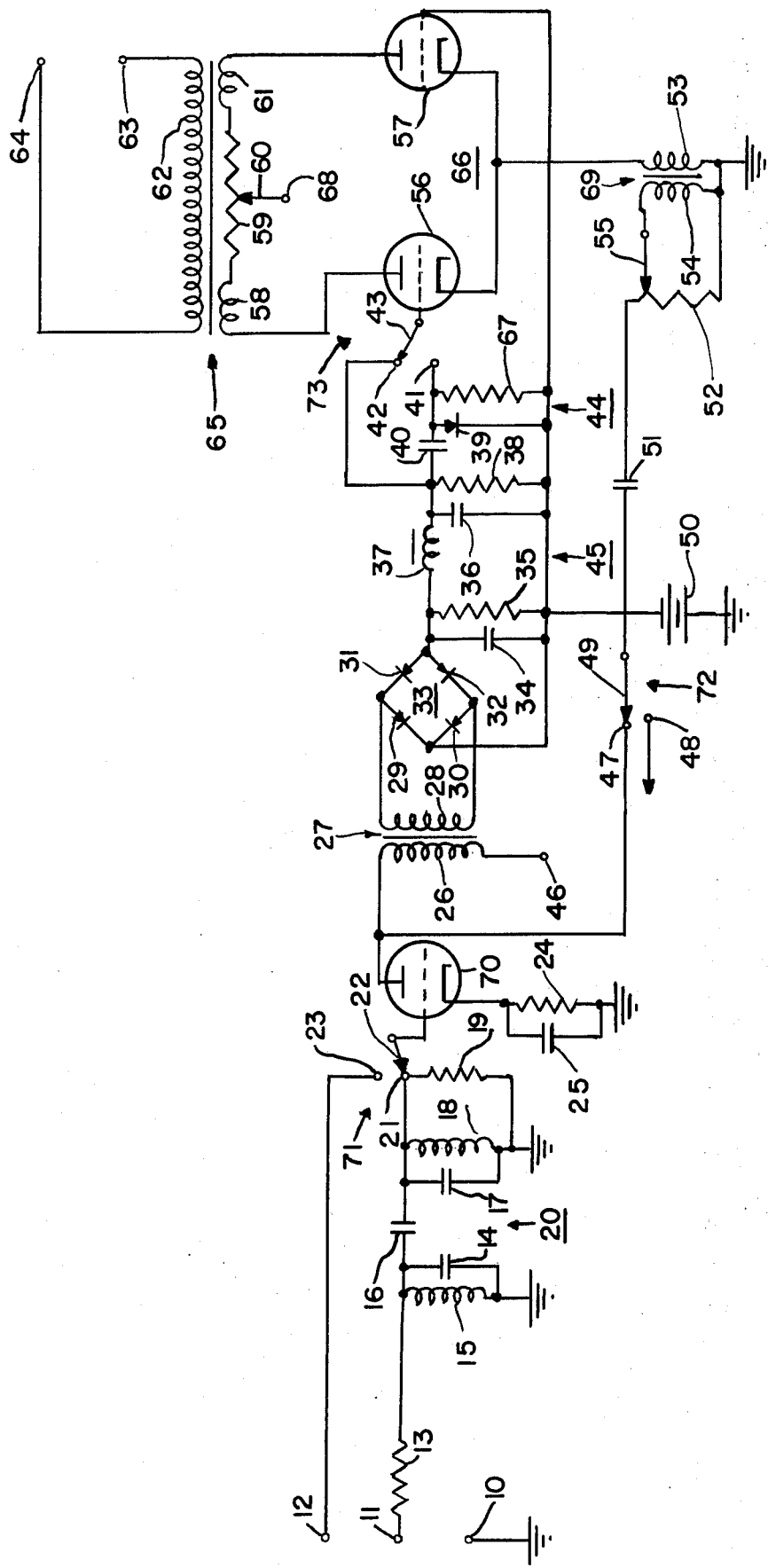

ELECTRICAL WAVE FILTER

BACKGROUND OF THE INVENTION

1. Field of the Invention

This invention relates to frequency selective systems, and is more particularly concerned with electric wave filter apparatus with a minimum ring for a given amount of selectivity and is also concerned with a circuit that will pass a radio telegraph signal with better efficiency than noise or other interference.

2. Description of the Prior Art

In the reception of radio telegraph signals and in other like applications, it is desirable to have a selective filter which provides for a cessation of output signal almost as soon as the input signal is removed. Unless this happens in radio telegraph reception, the dots and dashes will blend into each other and be very difficult to copy.

It is common practice to design a filter to respond to a wide band of frequencies in order to prevent the filter from having an output signal after the input signal to the filter has been removed. This design technique, however, defeats the purpose of the filter.

SUMMARY OF THE INVENTION

The existence of an output signal from a filter, after the input signal has been removed, will hereinafter be termed "decay time", and the present invention has as a primary object to provide less decay time, for a given amount of selectivity than conventional filters. Another object of the invention is that of providing a circuit that will pass a radio telegraph signal, or the like, with higher efficiency than it will pass noise or other interference.

A selective wave filter includes a band pass filter for receiving an input signal at, for example 1000 Hz. The output of the 1000 Hz band pass filter is connected to a rectifier, or the like, and the output of the rectifier is connected to a filter that will substantially remove the audio components and allow the resultant pulse to pass. The output of the filter is then employed to key a balanced modulator, voltage controlled amplifier or audio oscillator or the like to provide an output signal that may be read as an accurate representation of the input signal.

BRIEF DESCRIPTION OF THE DRAWING

The FIGURE is a schematic circuit diagram of a selective wave filter constructed in accordance with the principals of the present invention. Basically the invention includes a selective band pass filter feeding a rectifier, the rectifier feeds a filter and the output of the filter feeds an output circuit. The output circuit converts two input signals into a usable output signal.

DESCRIPTION OF THE PREFERRED EMBODIMENT

The FIGURE input terminals 10, 11 and 12 receive signals to be filtered. Terminal 10 is connected to ground. Terminal 11 is connected via resistor 13 to capacitor 14. Capacitor 14 is connected in parallel with inductor 15. Capacitor 16 is connected from capacitor 14 to capacitor 17. Capacitor 17, inductor 18 and resistor 19 are connected in parallel. Resistor 13, inductor 15, capacitor 14, capacitor 16, capacitor 17, inductor 18 and resistor 19 comprise the band pass filter 20. The output of band pass filter 20 is connected to stationary contact 21. Stationary contact 21 is connected to movable contact 22. Stationary contact 23 is connected to input terminal 12. Resistor 24 is connected in parallel with capacitor 25. Winding 26, located on transformer 27, is inductive coupled to winding 28 located on transformer 27. Diodes 29, 30, 31 and 32 comprise a full wave bridge rectifier 33. Capacitor 34 and 35 are connected in parallel and to the output of the full wave bridge rectifier 33. Capacitor 36 is connected to inductor 37. The series arm comprised of capacitor 36 and inductor 37 is connected to the output of the full wave bridge rectifier 33. The series arm comprised of inductor 37 and capacitor 36 include a resistor 38 connected in parallel with capacitor 36. Resistor 38 is connected to a series arm comprised of diode 39 and capacitor 40. Stationary contact 41 is connected to the anode of diode 39. Stationary contact 42 is connected to the junction formed by inductor 37, capacitor 36, resistor 38 and capacitor 40. The movable contact 43 is connected to the stationary contact 42. Diode 39, capacitor 40 and resistor 67 comprise the direct current blocking network 44. Capacitor 34, resistor 35, inductor 37, capacitor 36 and resistance 38 comprise the low pass filter 45. Terminal 46 is connected to a supply voltage. Stationary contact 47 is connected to winding 26 that is located on transformer 27. Stationary contact 48 is connected to an external audio oscillator. Stationary contact 47 is connected to movable contact 49. The negative terminal of battery 50 is connected to the positive output of rectifier 33. Capacitor 51 and resistor 52 form a series arm from movable contact 49 to ground. Winding 53 is inductive coupled to winding 54. Winding 54 is connected from the movable tap 55 to ground. The cathodes of triodes 56 and 57 are connected to ground via way of winding 53. The anode of triode 56 is connected to a supply voltage via winding 58, resistor 59 and movable arm 60. Winding 61 and winding 58 are inductive coupled to winding 62. Terminal 63 and terminal 64 serve as output terminals. Transformer 65, resistor 59, triodes 56 and 57, and transformer 69 comprise the output circuit 66. Resistor 67, diode 39 and capacitor 40 comprise the direct current blocking network 44. Terminal 68 is connected to an external power supply. The anode of triode 70 is connected to a supply voltage by way of primary winding 26 of a transformer 27. The cathode is connected to ground via way of resistor 24 that is connected to the cathode of triode 70. Switches 71, 72, and 73 select the operating modes of the invention.

Referring to the FIGURE, basically the invention comprises a selective band pass filter 20 connected to a rectifier 33. The output of rectifier 33 is connected to a low pass filter 45 and the output of filter 45 is connected to the output circuit 66. The direct current blocking network 44 may be switched in the circuit in order to block direct current from filter 45. The combination of low pass filter 45 and direct current blocking network 44 result in a band pass filter. The time constant of the direct current blocking network 44 is determined by values given herein. This time constant is such that typical radio telegraph direct current pulses will be passed while direct current pulses of substantially longer duration will be blocked by capacitor 40 as capacitor 40 reaches a fully charged condition thereby causing the current through resistor 67 to approach zero.

When the invention is used with a receiver that has a selective filter, such as filter 20 for example, input terminals 10 and 12 are used and the movable arm 22 located on switch 71 is placed on contact 23.

The center frequency of band pass filter 20 is 1000 Hz. It has a frequency response curve that is minus 6 decibels at 940 Hz and 1060 Hz.

The 1000 Hz output at terminals 63 and 64 is a result of the 1000 Hz signal applied to the primary of transformer 69 and the output of the low pass filter 45. If either input to the output circuit 66 is increased 10 per cent, the output at output terminals 63 and 64 will increase approximately 10 per cent. However, if both inputs to output circuit 66 are increased 10 per cent the output at output terminals 63 and 64 will increase approximately 18 per cent. When an input signal at input terminals 10 and 11 is changed in frequency or amplitude until the output of band pass filter 20 changes 10 per cent, the output at output terminals 63 and 64 will change approximately 18 per cent. For this reason the invention increases selectivity with out increasing decay time. The voltage gain between transformer 69 and output terminals 63 and 64 is increased by the output of filter 45.

When noise is connected to input terminals 10 and 11 a rectified and filtered noise envelope will appear at the grid of triode 56 and an AC noise envelope will appear across winding 53 located on transformer 69. These two noise envelopes will not reach their respective peaks at the same instant. This is because of a time delay introduced by low pass filter 45. The fact that the said peaks are not in phase cause the output at terminals 63 and 64 to be less than it would be if the peaks were in phase.

When a dot or dash is impressed across input terminals 10 and 11, a rectified and filtered signal envelope will appear at the grid of triode 56 and an AC signal envelope will appear at winding 53 located on transformer 69. These two envelopes will be at their maximum amplitude at the same time because a dot or dash is not in a constant state of change as is noise. The invention will therefore pass a dot or dash with better efficiency than noise.

With the proper circuit, the full wave bridge rectifier 33 may be replaced with any means that will produce a direct current component from an alternating current signal. This may be a tube or transistor biased to operate as a detector.

A voltage regulator may be connected across winding 28 located on transformer 27 in order to limit the voltage at the output of the low pass filter 45 to 4 volts. This will prevent the capacitors in the low pass filter 45 from being over charged.

The band pass filter that drives triode 70 may have a center frequency, for example, of 50 Kilo Hz. It is then necessary to heterodyne the signal at the input of transformer 69 to an audible frequency unless output at terminals 63 and 64 is to be used to drive a device that does not require an audible frequency.

Contact 48 on switch 72 may be connected to an external audio oscillator. The operator may then adjust the frequency of said oscillator to any frequency that pleases him.

When the movable arm 43 located on switch 73 is placed on contact 41, the direct current blocking network 44 is in use. The combination of low pass filter 45 and the direct current blocking network 44 result in a band pass filter because the direct current component will be blocked by capacitor 40. This mode of operation eliminates the need to adjust movable arm 60 on resistor 59 each time the noise level at the input terminals change in amplitude. The diode 39 provides a fast discharge path for capacitor 40.

When the input signal to be filtered has sufficient power, triode 70 may be eliminated by connecting the output of band pass filter 20 to winding 26 and to contact 47 located on switch 72.

The movable arm 55 located on resistor 52 is adjusted until the voltage across winding 53 is three tenths of a volt when the output voltage from low pass filter 45 is four volts.

Movable arm 60 located on resistor 59 is adjusted for the most desirable signal at output terminals 63 and 64.

Circuits constructed in accordance with the FIGURE operate quite well with the following component values.

| COMPONENT | VALUE |
|---|---|
| Resistors: | |
| 13 | 10,000 ohms |
| 19 | 30,000 ohms |
| 24 | 900 ohms |
| 35, 38 | 100,000 ohms |
| 67 | 3,300,000 ohms |
| 52 | 50,000 ohms |
| 59 | 5,000 ohms |
| Capacitors: | |
| 14, 17 | 0.25 microfarads |
| 16 | 0.02 microfarads |
| 25 | 5. microfarads |
| 34, 36 | .05 microfarads |
| 40 | 2. microfarads |
| 51 | 0.2 microfarads |
| Inductors: | |
| 15, 18 | 88 millihenrys |
| 37 | 350 henrys |
| Tubes: | |
| 56, 57 and 70 | 6J5 |

NOTE: All transformers are selected to provide the proper impedance match. Inductors 15 and 18 are high Q toroids. Of course, transistors may be used instead of vacuum tubes. Active filters may replace band pass filter 20 and low pass filter 45.

A switch may be added to switch contact 47 from the anode of triode 70 to input terminal 11. This switch will make it possible for the operator of the invention to select two degrees of selectivity.

The 9 volt battery 50 has its positive terminal connected to ground.

A direct current blocking network may be comprised of a high impedance transformer with a diode connected in parallel with its output winding. This network may be substituted for the direct current blocking network 44 shown in the FIGURE.

Although I have described my invention by reference to a particular illustrative embodiment thereof, many changes and modifications of my invention other than those specified above may become apparent to those skilled in the art without departing from the spirit and scope thereof. I therefore intend to include within the patent warranted hereon all such changes and modifications as may reasonably and properly be included within the scope of my contribution to the art.

I claim as my invention:

1. An electric wave filter comprising:
   a. input means for receiving alternating current noise energy and successive pulses of alternating current energy of predetermined input frequency;
   b. said alternating current noise energy and said pulses of alternating current energy of predetermined input frequency connected to a means for producing direct current components from said alternating current noise energy and said successive pulses of alternating current energy of predetermined input frequency;

c. a filter connected in the circuit with said means for producing direct current components for producing delayed direct current resultant noise envelopes and delayed direct current resultant pulse envelopes;

d. said delayed direct current resultant noise envelopes and said delayed direct current resultant pulse envelopes connected to increase the gain of an output circuit;

e. said alternating current noise energy and said successive pulses of alternating current energy of predetermined input frequency connected to said output circuit as output circuit pulse and noise source;

f. said delayed direct current resultant noise envelopes and said delayed direct current resultant pulse envelopes delayed sufficiently with respect to said alternating current noise energy and said successive pulses of alternating current energy of predetermined input frequency such that said successive pulses of alternating current energy of predetermined input frequency are passed through said output circuit more efficiently than said alternating current noise energy.

2. An electric wave filter according to claim 1 comprising:

a. a band pass filter, for selecting a band of frequencies, interposed between said input means and said means for producing direct current components.

3. An electric wave filter according to claim 1, comprising:

a. a direct current blocking network interposed between said direct current envelopes and said output circuit so as to substantially block pulses which require a substantially greater time interval than said alternating current pulses of electrical energy of predetermined input frequency.

* * * * *